(12) United States Patent
Yin et al.

(10) Patent No.: US 11,153,727 B2
(45) Date of Patent: Oct. 19, 2021

(54) PUSH MANAGEMENT SYSTEM OF WEARABLE DEVICE

(71) Applicant: Taiwan Name Plate Co., Ltd., Taoyuan (TW)

(72) Inventors: Wen-Cheng Yin, New Taipei (TW); Chi-Hung Chang, New Taipei (TW)

(73) Assignee: TAIWAN NAME PLATE CO., LTD., Taoyuan (TW)

( * ) Notice: Subject to any disclaimer, the term of this patent is extended or adjusted under 35 U.S.C. 154(b) by 0 days.

(21) Appl. No.: 16/874,910

(22) Filed: May 15, 2020

(65) Prior Publication Data

US 2021/0067920 A1 Mar. 4, 2021

(30) Foreign Application Priority Data

Aug. 27, 2019 (TW) ................................. 108211384

(51) Int. Cl.
| | | |
|---|---|---|
| *H04W 4/00* | (2018.01) | |
| *H04W 4/20* | (2018.01) | |
| *H04L 29/08* | (2006.01) | |
| *H04W 4/021* | (2018.01) | |
| *H04M 1/72409* | (2021.01) | |
| *H04W 80/12* | (2009.01) | |

(52) U.S. Cl.
CPC .............. *H04W 4/20* (2013.01); *H04L 67/20* (2013.01); *H04L 67/26* (2013.01); *H04M 1/72409* (2021.01); *H04W 4/021* (2013.01); *H04W 80/12* (2013.01)

(58) Field of Classification Search
CPC ........ H04W 4/20; H04W 4/021; H04L 67/26; H04L 67/20; H04L 29/08; H04M 1/72527; H04M 1/725

USPC .............. 455/466, 518, 519, 411, 418, 414.1
See application file for complete search history.

(56) References Cited

U.S. PATENT DOCUMENTS

| | | | |
|---|---|---|---|
| 8,448,816 B2 * | 5/2013 | Gordon .................. | A47K 10/16 221/32 |
| 9,992,642 B1 * | 6/2018 | Rapp ................... | H04W 68/005 |
| 2007/0027920 A1 * | 2/2007 | Alvarado ................ | H04L 67/04 |
| 2007/0027921 A1 * | 2/2007 | Alvarado ............. | G06Q 10/109 |
| 2011/0045801 A1 * | 2/2011 | Parker, II ................ | H04W 4/02 455/411 |
| 2012/0054288 A1 * | 3/2012 | Wiese ..................... | H04L 51/36 709/206 |

(Continued)

*Primary Examiner* — Marceau Milord
(74) *Attorney, Agent, or Firm* — Snyder, Clark, Lesch & Chung, LLP

(57) ABSTRACT

A push management system of a wearable device is provided, including a mobile communication device and a wearable communication device. The mobile communication device is connected to a plurality of third-party servers to receive a life message signal from the plurality of third-party servers; the mobile communication device includes a push management module and a processing module. The push management module includes a plurality of push management interfaces, each of the push management interfaces respectively corresponds to each of the third-party servers, and each of the push management interfaces has a push condition. The processing module receives the life message signal; the processing module determines whether the life message signal matches the push condition and generates a push signal when the life message signal matches the push condition.

12 Claims, 6 Drawing Sheets

(56) References Cited

U.S. PATENT DOCUMENTS

| | | | |
|---|---|---|---|
| 2012/0190386 A1* | 7/2012 | Anderson | G01S 19/14 455/456.3 |
| 2012/0311046 A1* | 12/2012 | Grigoriev | H04L 45/308 709/206 |
| 2013/0073377 A1* | 3/2013 | Heath | G06Q 30/02 705/14.39 |
| 2013/0137464 A1* | 5/2013 | Kramer | G06Q 30/0261 455/456.3 |
| 2014/0278882 A1* | 9/2014 | Yu | G06Q 30/0207 705/14.26 |
| 2015/0154634 A1* | 6/2015 | Chiu | G06Q 30/0253 705/14.51 |
| 2017/0251347 A1* | 8/2017 | Mehta | H04W 4/90 |
| 2018/0181741 A1* | 6/2018 | Whaley | H04W 12/06 |
| 2018/0332434 A1* | 11/2018 | Kulkarni | H04W 4/35 |
| 2019/0058958 A1* | 2/2019 | Proctor, Jr. | H04N 21/43615 |
| 2019/0132738 A1* | 5/2019 | Zhang | H04L 63/101 |
| 2019/0132931 A1* | 5/2019 | Sharma | H04W 12/06 |
| 2019/0268430 A1* | 8/2019 | van Gent | H04L 67/306 |

\* cited by examiner

PUSH MANAGEMENT SYSTEM OF WEARABLE DEVICE

CROSS-REFERENCE TO RELATED APPLICATION

This application claims priority from Taiwan Patent Application No. 108211384, filed on Aug. 27, 2019, in the Taiwan Intellectual Property Office, the content of which is hereby incorporated by reference in its entirety for all purposes.

BACKGROUND

1. Technical Field

The present disclosure relates to a technical field of push management, particularly to a push management system for managing wearable devices such as smart watches.

2. Description of the Related Art

Generally, smart watches are provided with various functions, such as calculation, playback, display, measurement, and the like. Most smart watches function together with smartphones, which may receive push signals from smartphones to display information.

However, most smart watches may only be set to receive or not to receive, display or not to display information without being able to filter or manage a specific push signal among a plurality of push signals, thus causing inconvenience to users.

In summary, the inventor of the present disclosure has designed a push management system of a wearable device in an effort to tackle deficiencies in the prior art and further to enhance the implementation and application in industries.

SUMMARY

In view of the aforementioned conventional problem, one objective of the present invention is to provide a push management system of a wearable device in order to solve the problems that may be encountered in the prior art.

Based on the above, the present disclosure provides a push management system of a wearable device, including a mobile communication device and a wearable communication device. The mobile communication device is connected to a plurality of third-party servers to receive a life message signal from the plurality of third-party servers. The mobile communication device includes a push management module and a processing module. The push management module includes a plurality of push management interfaces. Each of the push management interfaces respectively corresponds to each of the third-party servers, and each of the push management interfaces has a push condition. The processing module receives the life message signal, and the processing module determines whether the life message signal matches the push condition and generates a push signal when the life message signal matches the push condition. The wearable communication device is connected to the mobile communication device, and the wearable communication device receives the push signal and displays a push message according to the push signal.

Preferably, the third-party server is a server of a social networking website or a communication website, and the life message signal includes contact information.

Preferably, the push condition is that the contact information in the life message signal matches the contact information in the push management interface.

Preferably, the push management module further includes a plurality of push condition setting interfaces, each of the push condition setting interfaces respectively corresponds to each of the push management interfaces, and when the life message signal having the contact information is received for a first time, the push condition setting interface is triggered for adding the contact information to the push management interface.

Preferably, the third-party server is a server that stores bicycle rental information, the mobile communication device includes a positioning module, the positioning module generates a positioning signal of a current location of the mobile communication device, the life message signal includes the bicycle rental information, and the push condition is that the location indicated by the positioning signal and a bicycle rental location of the bicycle rental information are within a predetermined distance.

Preferably, the push message shows the bicycle rental location within the predetermined distance and a number of bicycles available to be rented corresponding to the bicycle rental location.

Preferably, the third-party server is a server that stores public transportation information, the mobile communication device includes a positioning module, the positioning module generates a positioning signal of a current location of the mobile communication device, the life message signal includes the public transportation information, and the push condition is that the current location indicated by the positioning signal and a transport stop/station location of the public transportation information are within a predetermined distance.

Preferably, the push message shows the transport stop/station location within the predetermined distance and arrival time of public transportation corresponding to the transport stop/station location.

Preferably, the push management module further includes a plurality of push condition setting interfaces, each of the push condition setting interfaces respectively corresponds to each of the push management interfaces, the push condition setting interface displays a plurality of public transportation routes according to the public transportation information and add at least one of the transport stop/station location of at least one of the public transportation route to be triggered to be added in the push management interface as one of the push condition.

Preferably, the push condition is that the location indicated by the positioning signal and the transport stop/station location matching the public transportation route are within the predetermined distance.

Preferably, the third-party server is a server of weather information, the life message signal is the weather information, the mobile communication device includes a positioning module, the positioning module generates a positioning signal of a current location of the mobile communication device, the life message signal includes the weather information, and the push condition is the weather information that matches the current location indicated by the positioning signal.

Preferably, the push message shows one of an air pollution level, a temperature value, a probability of precipitation, or a combination thereof that matches the current location indicated by the positioning signal.

The technical features of the present disclosure are to be described in detail below with specific embodiments and accompanying drawings to make a person of ordinary skill in the art effortlessly understand the purpose, technical features, and advantages of the present disclosure.

DESCRIPTION OF THE PREFERRED EMBODIMENTS

To facilitate the understanding of the technical features, contents, advantages, and achievable effects of the present disclosure, the embodiments together with the accompanying drawings are described in detail as follows. However, the drawings are used only for the purpose of indicating and supporting the specification, which is not necessarily the real proportion and precise configuration after the implementation of the present disclosure. Therefore, the relations of the proportion and configuration of the accompanying drawings should not be interpreted to limit the actual scope of implementation of the present disclosure.

It should be noted that when one element is referred to as being "connected to," "disposed on," or "installed on" another element, it may be directly connected to or disposed on another element, or an intermediate element may exist therebetween. In addition, the terms "first," "second," and "third" are used for descriptive purposes only and are not to be construed as indicating or implying relative importance or the relationship of a sequence or direction thereof.

The embodiments of the push management system of the present disclosure are described with reference to the related drawings. For ease of understanding, the same elements in the following embodiments are described in accordance with the same numerals.

Figure 1:
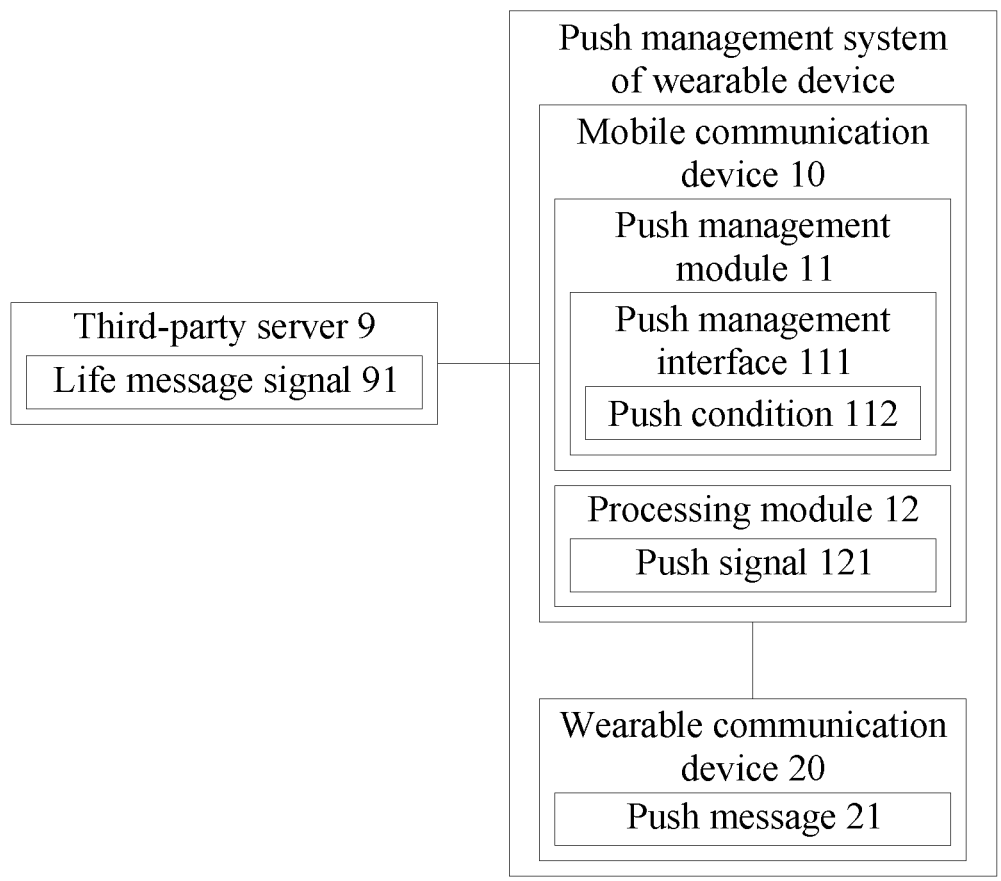
FIG. 1 is a block diagram of the push management system of the wearable device according to the present disclosure.

Please refer to FIG. 1 which is a block diagram of the push management system of the wearable device according to the present disclosure.

As shown, the wearable communication device of the wearable device includes a mobile communication device 10 and a wearable communication device 20. The mobile communication device 10 may be a smartphone, a tablet PC, or the like, which is connected to a plurality of third-party servers 9 to receive a life message signal 91 from the plurality of third-party servers 9. The mobile communication device 10 includes a push management module 11 and a processing module 12. The push management module 11 includes a plurality of push management interfaces 111. Wherein, each of the push management interfaces 111 respectively corresponds to each of the third-party servers 9, and each of the push management interfaces 111 has a push condition 112. The processing module 12 receives the life message signal 91, and the processing module 12 determines whether the life message signal 91 matches the push condition 112 and generates a push signal 121 when the life message signal 91 matches the push condition 112. The push management module 11 and the processing module may be a microprocessor or an application specific integrated circuit (ASIC). The wearable communication device 20 may be a smart watch and the like, which is connected to the mobile communication device 10, and the wearable communication device 20 receives the push signal 121 and displays a push message 21 according to the push signal 121.

Specifically, the third-party server 9 may provide a message related to traffic information, weather information, or shopping discount information from a social networking website or a communication website. Moreover, the mobile communication device 10 may block or filter the sent push signal 121 by the configuration of the push management interface 111, so that the wearable communication device 20 may display the push message 21 according to the push signal 121 that is not blocked or filtered.

Each embodiment is to be described below.

Figure 2:
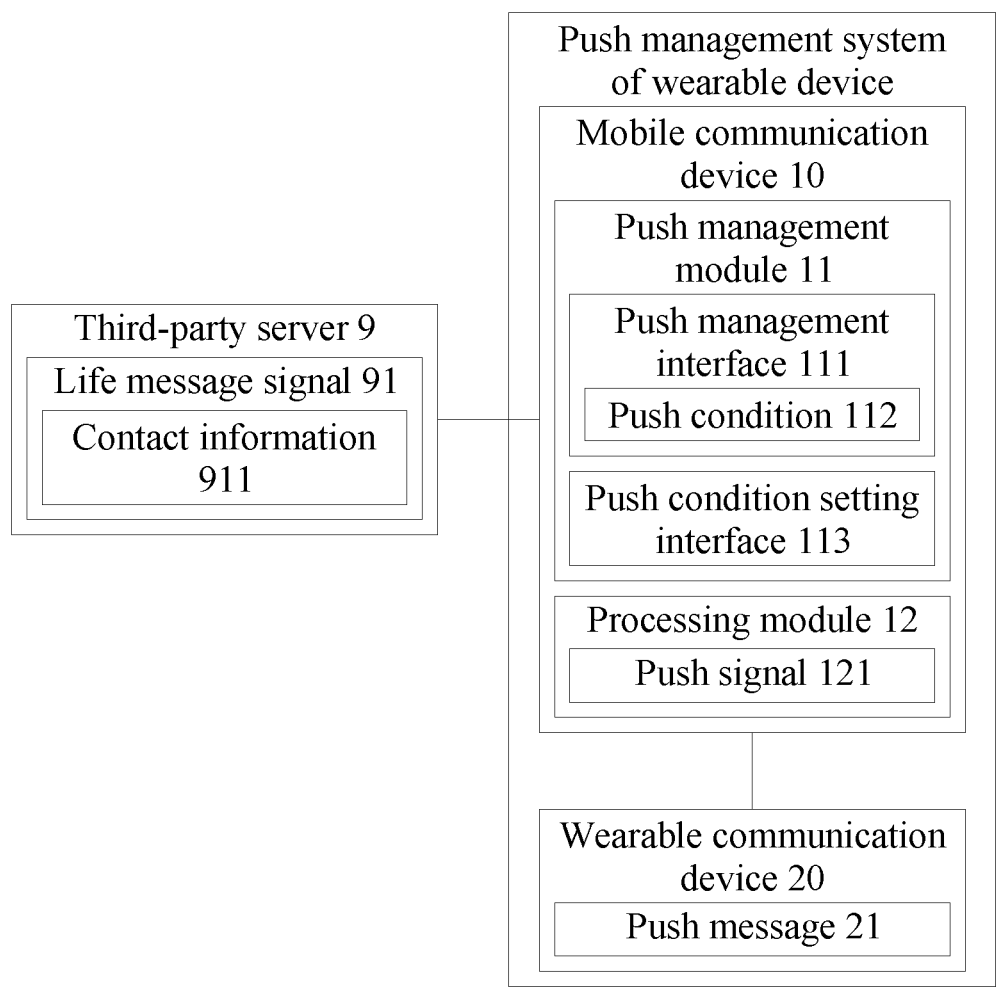
FIG. 2 is a block diagram of the first embodiment of the push management system of the wearable device according to the present disclosure.

Please refer to FIG. 2 which is a block diagram of the first embodiment of the push management system of the wearable device according to the present disclosure.

As shown, in the present embodiment, the third-party server 9 is a server of a social networking website or communication website, and the life message signal 91 includes contact information 911. Wherein, the mobile communication device 10 may have a plurality of applications that may be respectively in communication with the servers of different social networking websites or communication websites in order to receive the life message signal 91 through these installed applications.

The push condition 112 may require the contact information 911 in the life message signal 91 match the contact information 911 in the push management interface 111.

That is to say, when the mobile communication device 10 receives the life message signal 91 including the contact information 911 through applications related to social networking websites or communication websites, the processing module 12 compares whether the contact information 911 exists in the list of the push management interface 111. If the contact information 911 in the life message signal 91 matches the contact information in the list of the push management interface 111, the processing module 12 generates a push signal 121 which corresponds to the life message signal 91 and sends the push signal 121 to the wearable communication device 20. Therefore, after the wearable communication device 20 receives the push signal 121, the push message 21 may be displayed to the user according to the content of the push signal 121.

For example, in the scenario that two life message signals 91 sent from the third-party server 9 of the communication website A respectively include contact information 911 such as XXX and YYY, and the contact information 911 of XXX only exists in the list of the push management interface 111. Since the contact information 911 of YYY does not exist in the list of the push management interface 111, the life message signal 91 including the contact information 911 of YYY does not match the push condition 112. Accordingly, the processing module 12 may only generate the push signal 121 corresponding to the life message signal 91 with the contact information 911 of XXX, so that after receiving the push signal 121, the wearable communication device 20 may display the push message 21 to the user according to the content of the push signal 121 which may include the life message signal 91 with the contact information 911 of XXX.

It should be noted that the push management module 11 may include a plurality of push management interfaces 111 which respectively correspond to different third-party servers 9. For instance, the first push management interface 111 may correspond to the server of the social networking website A; the second push management interface 111 may correspond to the server of the social networking website B; the third push management interface 111 may correspond to the server of the communication website A; the fourth push management interface 111 may correspond to the server of the communication website B, etc.

In addition, the push management module 11 further includes a plurality of push condition setting interfaces 113. Each of the push condition setting interfaces 113 respectively corresponds to each of the push management interfaces 111; that is to say, each of the push condition setting interfaces 113 also respectively corresponds to each of the third-party servers. In the push condition setting interface 113 for the life message signal 91, an option may be provided such that when the life message signal 91 includes contact information 911 that is received or appeared for the first time, the push condition setting interface 113 may be selectively triggered to add the contact information 911 to the list of the push management interface 111.

That is to say, when the life message signal 91 sent from the third-party server 9 of the communication website A includes contact information 911, such as XXX, that appears for the first time, the push condition setting interface 113 may prompt and ask the user whether to add XXX to the list of the push management interface 111.

In short, the push management system of the wearable device of the present disclosure is able to effectively manage or filter the pushing of a message from a social networking website or a communication website by the configuration of the push management interface 111 and the push condition setting interface 113, enabling the user to only see the push message 21 that the user wants to see on the wearable communication device 20.

Figure 3:
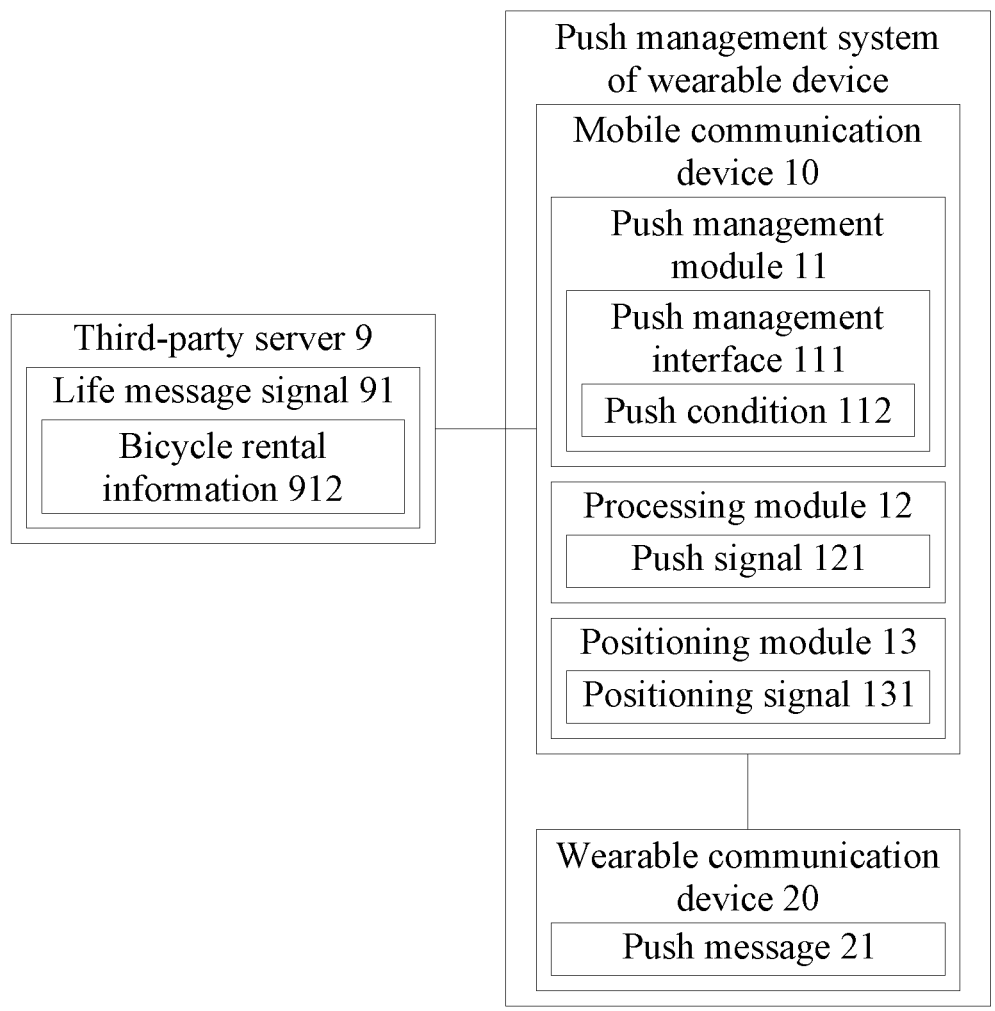
FIG. 3 is a block diagram of the second embodiment of the push management system of the wearable device according to the present disclosure.

Please refer to FIG. 3 which is a block diagram of the second embodiment of the push management system of the wearable device according to the present disclosure.

As shown, in the present embodiment, the third-party server 9 is a server that stores bicycle rental information 912. The mobile communication device 10 includes a positioning module 13, and the positioning module 13 generates a positioning signal 131 of the current location of the mobile communication device 10. The positioning module 13 may be an integrated circuit being able to provide positioning information of the device, for example, by global positioning system (GPS) or assisted global positioning system (A-GPS). The life message signal 91 including the bicycle rental information 912 may be provided by the third-party server 9 storing the bicycle rental information 912.

The push condition 112 may require the positioning signal 131 and a bicycle rental location of the bicycle rental information 912 be within a predetermined distance. Wherein, the push message 21 shows the bicycle rental location within the predetermined distance and the number of bicycles available to be rented corresponding to the bicycle rental location.

In other words, the mobile communication device 10 obtains life message signals 91 from various places through the third-party server 9, including bicycle rental information 912. When the positioning signal 131 indicates that the mobile communication device 10 is located in area A, the processing module 12 of the mobile communication device 10 compares the life message signal 91 obtained from the third-party server 9 and the positioning signal 131 to determine whether the location indicated by the positioning signal 131 and a bicycle rental location of the bicycle rental information 912 are within a predetermined distance. Next, the push signal 121 is generated according to the bicycle rental information 912 within a predetermined distance, so that the wearable communication device 20 after receiving the push signal 121 displays the push message 21 to the user according to the content of the push signal 121. Accordingly, the wearable communication device 20 may display information as notification related to area A, such as "where a nearby bicycle rental is" and "how many bicycles are available for rent".

In short, the push management system of the wearable device of the present disclosure may effectively manage or filter the life message signal 91 from the third-party server 9 by the configuration of the push management interface 111 and the push condition setting interface 113, enabling the user to only see the push message 21 related to bicycle rental stations in an area where the user is located on the wearable communication device 20.

Figure 4:
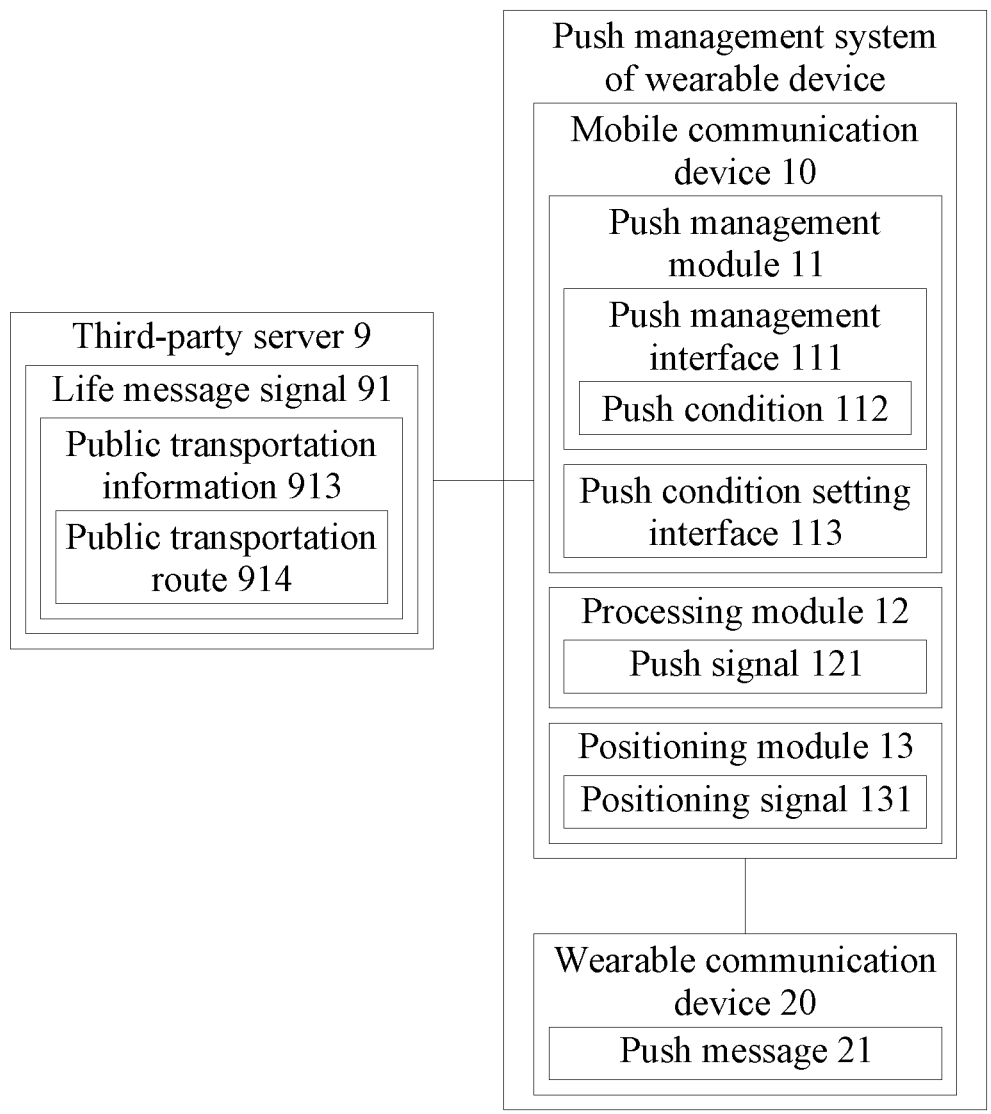
FIG. 4 is a block diagram of the third embodiment of the push management system of the wearable device according to the present disclosure.

Please refer to FIG. 4 which is a block diagram of the third embodiment of the push management system of the wearable device according to the present disclosure.

As shown, in the present embodiment, the third-party server 9 may be a server that stores public transportation information 913. The mobile communication device 10 includes a positioning module 13, and the positioning module 13 generates a positioning signal 131 of the current location of the mobile communication device 10. The life message signal 91 includes the public transportation information 913.

The push condition 112 may require the positioning signal 131 and a transport stop/station location of the public transportation information 913 be within a predetermined distance. The push message 21 shows the transport stop/station location within the predetermined distance and arrival time of public transportation corresponding to the transport stop/station location. For example, the location of a bus stop within a 500-meter range and the estimated arrival time that the bus would get to the bus stop.

In other words, the mobile communication device 10 obtains the life message signals 91 of various places from the third-party server 9, including the public transportation information 913. When the positioning signal 131 indicates that the mobile communication device 10 is located in area A, the processing module 12 of the mobile communication device 10 compares the life message signal 91 obtained from the third-party server 9 and the positioning signal 131 to determine whether the location indicated by the positioning signal 131 and a transport stop/station location of the public transportation information 913 are within a predetermined distance. Next, the push signal 121 is generated according to the public transportation information 913 within a predetermined distance, so that the wearable communication device 20 after receiving the push signal 121 displays the push message 21 to the user according to the content of the push signal 121. Therefore, the wearable communication device 20 may display information as notification, such as "where a nearby transport stop/station location is" and "the estimated time of arrival of the public transportation".

In addition, the push management module 11 further includes a plurality of push condition setting interfaces 113, and each of the push condition setting interfaces 113 respectively corresponds to each of the push management interfaces 111. The push condition setting interface 113 displays a plurality of public transportation routes 914 according to the public transportation information 913, and at least one of the transport stop/station location of at least one of the public transportation route 914 may be triggered to be added in the push management interface 111 as one of the push condition 112.

That is to say, when the life message signal 91 is obtained from the third-party server 9, which includes a plurality of public transportation routes 914, bus 360 and bus 903 for instance, the push condition setting interface 113 may prompt and ask the user whether to add bus 360 and bus 903 to the list of push management interface 111. When the user adds bus 360 to the list of the push management interface 111, the push condition setting interface 113 further prompts and asks the user to select relevant bus stops (such as departures and arrivals) in order to add them together to the list of push management interface 111.

At the moment, the push condition 112 is that the position indicated by the positioning signal 131 and the transport stop/station location which matches the public transportation route 914 are within the predetermined distance.

For instance, the user adds the transport stop/station A of the bus 306 to the list of the push management interface 111 by using the push condition setting interface 113. When the distance between the user and the transport stop/station A of the bus 306 is less than 250 meters, the wearable communication device 20 may display information as notification such as "where the nearby transport stop/station location A is" and "arrival time of the bus 306".

In short, the push management system of the wearable device of the present disclosure may effectively manage or filter the life message signal 91 from the third-party server 9 by the configuration of the push management interface 111 and the push condition setting interface 113, enabling the user to see the push message 21 related to the public transportation in an area where the user is located or the public transportation set by the user on the wearable communication device 20.

Figure 5:
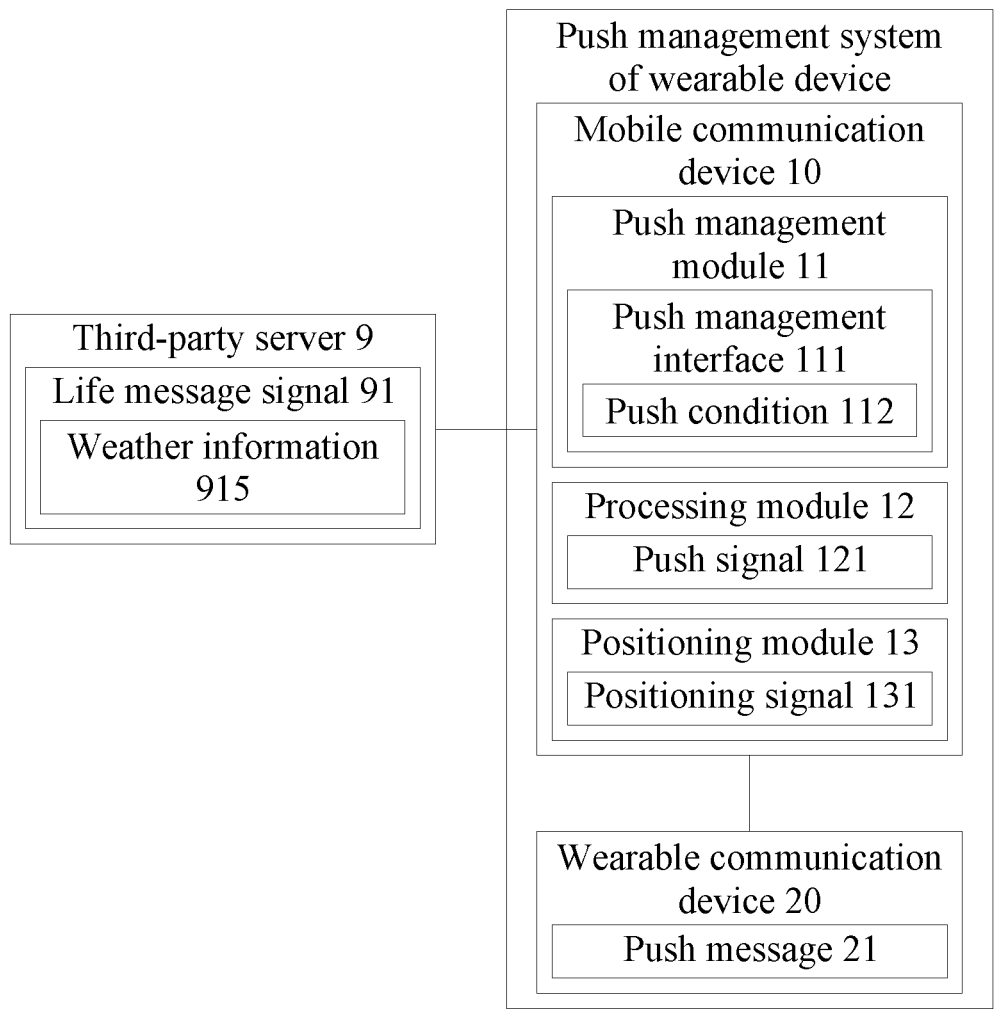
FIG. 5 is a block diagram of the fourth embodiment of the push management system of the wearable device according to the present disclosure.

Please refer to FIG. 5 which is a block diagram of the fourth embodiment of the push management system of the wearable device according to the present disclosure.

As shown, in the present embodiment, the third-party server 9 is a server of weather information 915, and the life message signal 1 is the weather information 915. The mobile communication device 10 includes a positioning module 13, and the positioning module 13 generates a positioning signal 131 of the current location of the mobile communication device 10. The life message signal 91 includes the weather information 915, and the push condition 112 is the weather information that matches the location of the positioning signal 131.

It should be noted that the push message 21 may show one of an air pollution level, a temperature value, a probability of precipitation, or a combination thereof that matches the location of the positioning signal 131.

In other words, the mobile communication device 10 obtains the life message signals 91 of various places from the third-party server 9, including the weather information 915 at various places. When the positioning signal 131 indicates that the mobile communication device 10 is located in area A, the processing module 12 of the mobile communication device 10 compares the life message signal 91 obtained from the third-party server 9 and the positioning signal 131 to determine whether the location indicated by the positioning signal 131 and a location of a certain area of weather information 915 in various places are within a predetermined distance. Next, the push signal 121 is generated according to the life message signal 91 (that is, weather information 915 at a location of a certain area) within a predetermined distance, so that the wearable communication device 20 displays the push message 21 to the user according to the content of the push signal 121 after receiving the push signal 121. Accordingly, the wearable communication device 20 may display information related to a location of a certain area as a notification, such as one of the air pollution level (such as the value of PM2.5), the temperature value, the probability of precipitation, or a combination thereof.

In short, the push management system of the wearable device of the present disclosure may effectively manage or filter the life message signal 91 from the third-party server 9 by the setup of the push management interface 111 and the push condition setting interface 113, enabling the user to only see the push message 21 related to the weather information 915 in an area where the user is located on the wearable communication device 20.

Figure 6:
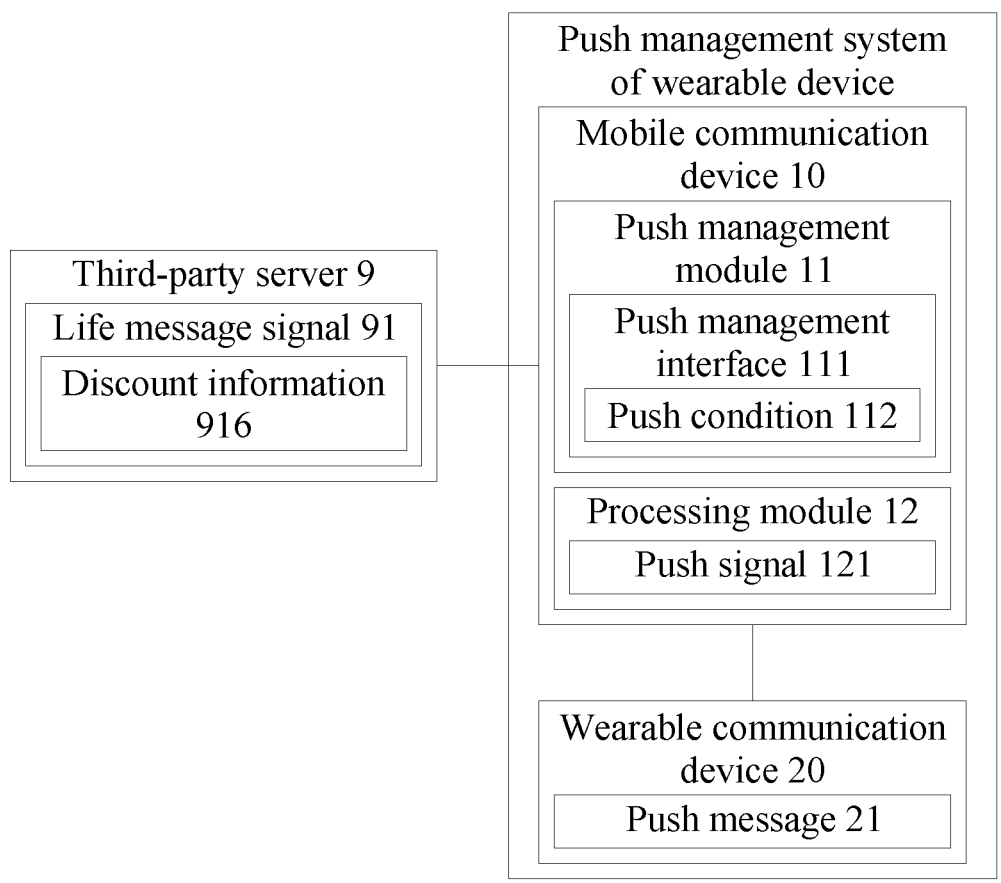
FIG. 6 is a block diagram of the fifth embodiment of the push management system of the wearable device according to the present disclosure.

Please refer to FIG. 6 which is a block diagram of the fifth embodiment of the push management system of the wearable device according to the present disclosure.

As shown, in the present embodiment, the third-party server 9 may be a server of a shopping website or a sales promotion website, and the life message signal 91 may include discount information 916.

Wherein, the processing module 12 may compare whether the information related to the life message signal 91 matches the discount information set by the push condition 112. Next, the processing module 12 generates the received information which matches the discount information in the life message signal 91 as a push signal 121 and transmits it to the wearable communication device 20. Accordingly, the wearable communication device 20 may display various discount information in a way of a list to remind the user of the information.

It should be noted that the push management module 11 may be realized by a mobile communication device 10 via applications downloaded and installed on the mobile communication device 10. Certainly, the push management module 11 may also be realized by a combination of hardware and firmware.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A push management system of a wearable device, comprising:
    a mobile communication device connected to a plurality of third-party servers to receive a life message signal from the plurality of third-party servers, the mobile communication device comprising:
        a push management module comprising a plurality of push management interfaces, each of the push management interfaces respectively corresponding to each of the third-party servers, and each of the push management interfaces having a push condition; and
        a processing module receiving the life message signal, the processing module determining whether the life message signal matches the push condition and generating a push signal when the life message signal matches the push condition; and
    a wearable communication device connected to the mobile communication device, the wearable communication device receiving the push signal and displaying a push message according to the push signal.

2. The push management system of the wearable device according to claim 1, wherein the third-party server is a server of a social networking website or a communication website, and the life message signal comprises contact information.

3. The push management system of the wearable device according to claim 2, wherein the push condition is that the contact information in the life message signal matches the contact information in the push management interface.

4. The push management system of the wearable device according to claim 3, wherein the push management module further comprises a plurality of push condition setting interfaces, each of the push condition setting interfaces respectively corresponds to each of the push management interfaces, and when the life message signal having the contact information is received for a first time, the push condition setting interface is triggered for adding the contact information to the push management interface.

5. The push management system of the wearable device according to claim 1, wherein the third-party server is a server that stores bicycle rental information, the mobile communication device comprises a positioning module, the positioning module generates a positioning signal of a current location of the mobile communication device, the life message signal comprises the bicycle rental information, and the push condition is that the current location indicated by the positioning signal and a bicycle rental location of the bicycle rental information are within a predetermined distance.

6. The push management system of the wearable device according to claim 5, wherein the push message shows the bicycle rental location within the predetermined distance and a number of bicycles available to be rented corresponding to the bicycle rental location.

7. The push management system of the wearable device according to claim 1, wherein the third-party server is a server that stores public transportation information, the mobile communication device comprises a positioning module, the positioning module generates a positioning signal of a current location of the mobile communication device, the life message signal comprises the public transportation information, and the push condition is that the current location indicated by the positioning signal and a transport stop/station location of the public transportation information are within a predetermined distance.

8. The push management system of the wearable device according to claim 7, wherein the push message shows the transport stop/station location within the predetermined distance and arrival time of public transportation corresponding to the transport stop/station location.

9. The push management system of the wearable device according to claim 8, wherein the push management module further comprises a plurality of push condition setting interfaces, each of the push condition setting interfaces respectively corresponds to each of the push management interfaces, the push condition setting interface displays a plurality of public transportation routes according to the public transportation information and add at least one of the transport stop/station location of at least one of the public transportation route to be triggered to be added in the push management interface as one of the push condition.

10. The push management system of the wearable device according to claim 9, wherein the push condition is that the current location indicated by the positioning signal and the transport stop/station location matching the public transportation route are within the predetermined distance.

11. The push management system of the wearable device according to claim 1, wherein the third-party server is a server of weather information, the life message signal is the weather information, the mobile communication device comprises a positioning module, the positioning module generates a positioning signal of a current location of the mobile communication device, the life message signal comprises the weather information, and the push condition is the weather information that matches the current location indicated by the positioning signal.

12. The push management system of the wearable device according to claim 11, wherein the push message shows one of an air pollution level, a temperature value, a probability of precipitation, or a combination thereof that matches the current location indicated by the positioning signal.

* * * * *